United States Patent [19]
Adams et al.
[11] Patent Number: 4,586,977
[45] Date of Patent: May 6, 1986

[54] METHOD OF BONDING A HIGH TEMPERATURE RESISTANT POLYMERIC MATERIAL TO AN ALUMINUM BASE SUBSTRATE

[75] Inventors: Kenneth J. Adams, Novelty; David E. Dyke, Shaker Heights, both of Ohio

[73] Assignee: Imperial Clevite Inc., Glenview, Ill.

[21] Appl. No.: 596,359

[22] Filed: Apr. 3, 1984

[51] Int. Cl.[4] .......... C09J 5/02; C23C 22/67; B05D 5/10

[52] U.S. Cl. .......... 156/308.6; 156/319; 156/309.6; 148/6.2; 148/6.27; 427/327; 427/388.1

[58] Field of Search .......... 156/307.3, 308.6, 309.6, 156/319, 278; 148/6.2, 6.27; 427/327, 388.1, 416, 418, 409, 437, 443.2; 106/14.05, 302, 303, 298, 299; 423/625

[56] References Cited

U.S. PATENT DOCUMENTS

| | | | |
|---|---|---|---|
| 2,092,034 | 9/1937 | Stroup | 148/6.27 X |
| 2,127,202 | 8/1938 | Boyle | 148/6.2 |
| 2,294,334 | 8/1942 | Filbert | 148/6.0 |
| 2,387,528 | 10/1945 | Patterson et al. | 106/302 |
| 2,493,934 | 1/1950 | Waring | 148/6.2 |
| 2,520,475 | 8/1950 | Sonnino | 148/6.27 X |
| 2,562,118 | 7/1951 | Osdal | 148/6.16 |
| 2,846,342 | 8/1958 | Curtin | 148/6.16 |
| 2,898,250 | 8/1959 | Pimbley | 148/6.21 |
| 3,039,898 | 6/1962 | Keller | 148/6.14 |
| 3,793,055 | 2/1974 | Shodai et al. | 117/47 R |
| 3,801,379 | 4/1974 | Blackwell | 427/327 X |
| 3,846,170 | 11/1974 | Isawa et al. | 148/6.2 X |
| 3,864,139 | 2/1975 | Keller | 106/287 R |
| 3,871,894 | 3/1975 | Kubo et al. | 106/302 |
| 3,900,689 | 8/1975 | Deyrup | 156/326 X |
| 4,138,526 | 2/1979 | Borresen et al. | 428/419 |
| 4,361,620 | 11/1982 | Newton | 428/341 |
| 4,421,795 | 12/1983 | Davies | 427/385.5 |

FOREIGN PATENT DOCUMENTS

| | | | |
|---|---|---|---|
| 2739576 | 5/1978 | Fed. Rep. of Germany | 148/6.27 |
| 5834178 | 2/1983 | Japan | 148/6.2 |

OTHER PUBLICATIONS

*Surface Treatment and Finishing of Aluminum and Its Alloys;* Wernick et al.; Robert Draper Ltd.; pp. 163, 164, 168, 169, 182, 183; 1956.

*Metals Handbook;* 8th edition, vol. 2, "Heat Treating, Cleaning, and Finishing"; Chromate Conversion Coating; p. 547; 1964.

*Primary Examiner*—Edward Kimlin
*Assistant Examiner*—Ramon R. Hoch
*Attorney, Agent, or Firm*—Russell E. Baumann

[57] ABSTRACT

A method for bonding a high temperature resistant polymeric material to an aluminum base substrate is disclosed using an alkaline bath comprising an alkali metal salt, an alkali metal carbonate and a water soluble salt of an alkaline earth metal selected from the group consisting of calcium, barium, strontium and mixtures thereof.

16 Claims, No Drawings

METHOD OF BONDING A HIGH TEMPERATURE RESISTANT POLYMERIC MATERIAL TO AN ALUMINUM BASE SUBSTRATE

BACKGROUND OF THE INVENTION

The present invention relates to the art of coating aluminum and aluminum alloy metal surfaces with polymeric materials. More particularly, the present invention is directed to a method of coating aluminum surfaces with a high temperature resistant polymeric material and/or compounds thereof.

Aluminum and aluminum alloy materials (herein collectively referred to as "aluminum base" materials or substrates) are often used in a hostile environment. That is, articles fabricated from aluminum base materials are often employed in an atmosphere which has a deleterious effect on the surface of the so-fabricated article. Accordingly, in the past, numerous means have been devised for protecting the aluminum or aluminum alloy surface from various types of hostile environments. Such techniques range from chemically or electrochemically treating the surface of the aluminum base substrate to covering it with a polymeric coating or overlay.

In many instances, it would be desirable to protect the surface of the aluminum base substrate or make a light weight component by coating it with an overlay of a special type of polymeric materials. However, when one attempts to adherently bond most polymeric materials to an aluminum base substrate, difficulties are often experienced. This is especially true when attempting to bond high temperature resistant polymeric materials to an aluminum base substrate.

Accordingly, it is the principal object of the present invention to provide a means for rendering the surface of an aluminum base substrate amenable for receiving and having bonded thereto a high temperature resistant polymeric material and/or compounds thereof.

These and other objects of the present invention will become apparent from a reading of the following specification and claims.

SUMMARY OF THE INVENTION

In one aspect, the present invention concerns a method for bonding a high temperature resistant polymeric material to an aluminum base substrate comprising providing an aqueous bath containing an alkali metal salt selected from the group consisting of sodium, potassium, cesium, rubidium and mixtures thereof of chromic acid and an alkali metal carbonate in a ratio of from 3 to 1 up to 9 to 1 wherein the carbonate concentration is at least about 0.0625 mole/liter, and from about 0.0005 mole/liter up to its saturation point in the bath of a water soluble salt of an alkaline earth metal from the group consisting of calcium, barium, strontium and mixtures thereof; immersing the portion of the substrate which is to be coated with the polymer material into the bath for a time and at a temperature sufficient to cause a surface conversion coating to form on the exposed surface of the substrate; removing the substrate from the aqueous bath after the formation of the conversion coating thereon; applying at least one high temperature polymeric material selected from the group consisting of polyphenylene sulfide, polysulfone, polyphenylsulfone, polyethersulfone, polyetheretherketone, polyetherimide and polyamideimide and polymeric compounds containing them to the surface of the substrate which is to be coated; heating said so-applied polymeric material to a temperature sufficient to cause it to flow and cover that portion of the substrate which is to be coated; and cooling the heated coating to a temperature sufficient to cause it to solidify and become adherently bonded to the substrate.

In another aspect, the present invention concerns a method for bonding a high temperature resistant polymeric material to an aluminum base substrate comprising providing an aqueous bath containing an alkali metal salt selected from the group consisting of sodium, potassium, cesium, rubidium and mixtures thereof of chromic acid and an alkali metal carbonate in a ratio of from 3 to 1 up to 9 to 1 wherein the carbonate concentration is at least about 0.0625 mole/liter, and from about 0.0005 mole/liter up to its saturation point in the bath of a water soluble salt of an alkaline earth metal from the group consisting of calcium, barium, strontium and mixtures thereof; immersing the portion of the substrate which is to be coated with the polymer material into the bath for a time and at a temperature sufficient to cause a surface conversion coating to form on the exposed surface of the substrate; removing the substrate from the aqueous bath after the formation of the conversion coating thereon; heating said coating [to drive off all moisture]; applying at least one polymeric material selected from the group consisting of polyphenylene sulfide, polysulfone, polyphenysulfone, polyethersulfone, polyetheretherketone, polyetherimide and polyamideimide and polymeric compounds containing them to the surface of the substrate which is to be coated; heating said so-applied polymeric material to a temperature sufficient to cause it to flow and cover that portion of the substrate which is to be coated; and cooling the heated coating to a temperature sufficient to cause it to solidify and become adherently bonded to the substrate.

In still another aspect, the present invention relates to a method of treating an aluminum base substrate to render it suitable for bonding a high temperature resistant polymeric material thereto which comprises providing an aqueous bath containing an alkali metal salt selected from the group consisting of sodium, potassium, cesium, rubidium and mixtures thereof and chromic acid and an alkali metal carbonate in a ratio of from 3 to 1 up to 9 to 1 wherein the carbonate concentration is at least about 0.0625 mole/liter, and from about 0.0005 mole/liter up to its saturation point in the bath of a water soluble salt of an alkaline earth metal from the group consisting of calcium, barium, strontium and mixtures thereof; immersing the portion of the aluminum base substrate which is to be coated with the polymer material in the bath for a period of time and at a temperature sufficient to cause a surface conversion coating to form on the exposed surface of the substrate; and removing the substrate from the aqueous bath after the formation of the conversion coating thereon.

DETAILED DESCRIPTION OF THE PREFERRED EMBODIMENTS OF THE INVENTION

The present invention provides a means of bonding high temperature resistant polymeric materials to an aluminum base substrate and is especially useful for aluminum alloys containing high percentages of alloying elements. In this regard, the term aluminum base as used herein is intended to include both aluminum and aluminum alloys. Typical of such alloys are ASM designations 2024, 3003, 5052, 6061 and 7075. The present invention would be equally useful for multilayer material combinations wherein the aluminum base material is the surface material such as aluminum coated steel.

The aqueous bath used in the practice of the invention to form the conversion coating is alkaline and preferably contains an alkali metal salt selected from the group consisting of sodium, potassium, cesium, rubidium and mixtures thereof of chromic acid and an alkali metal carbonate, with the alkali metal being selected from the group consisting of sodium, potassium, cesium, rubidium and mixtures thereof, in a ratio of from 3 to 1 up to 9 to 1 wherein the carbonate concentration is at least about 0.0625 mole/liter (accordingly, about 0.00693 for the chromic acid salt), and from about 0.0005 mole/liter up to its saturation point in the bath of a water soluble salt of an alkaline earth metal selected from the group consisting of calcium, barium, strontium and mixtures thereof. The upper limit of the alkali metal salts is their mutual saturation point in the bath.

In the preferred practice of the invention, the alkali metal salt of chromic acid is sodium chromate ($Na_2CrO_4$), the alkali metal carbonate is sodium carbonate ($Na_2CO_3$) and the water soluble salt of the alkaline earth metal is calcium chloride ($CaCl_2$). That is, it is preferred to use a sodium salt of chromic acid, a sodium carbonate compound and a water soluble calcium salt.

The aluminum base substrate which is to be coated with a high temperature resistant polymeric material is immersed in the conversion coating bath for a period of time and at a temperature sufficient to cause the conversion coating to form on the exposed surface of the substrate. In the practice of the invention, the residence time in the bath ranges from about two minutes to about twenty minutes, with a preferred range from five to fifteen minutes. The temperature of the bath ranges from about 85° F. up to the boiling point of the bath. It is to be understood that the temperature of the bath and the time in the bath are interrelated with the time needed in the bath reduced for a higher temperature bath.

Preferably, the high temperature resistant polymeric material utilized in the practice of the invention is selected from the group consisting of polyphenylene sulfide, polysulfone, polyphenylsulfone, polyethersulfone, polyetheretherketone, polyetherimide and polyamideimide and polymeric compounds containing them. The foregoing materials are considered high temperature polymers in that they meet the 302° F. UL Temperature Index.

The concerned high temperature resistant polymeric material can be applied to the so-treated substrate in a number of ways. The preferred method is to apply the polymeric material in pellet or powder form. However, such techniques as electrostatic spraying and injection or compression molding may also be utilized. Other means of applying the polymeric material to the substrate are well known in the art and for the sake of brevity will not be discussed herein.

Additionally, while not necessary, it has been found especially beneficial to heat the conversion coated substrate prior to applying the polymeric material to ensure that nearly all moisture is removed from the coating. Typically, this heating is done between 400° F. and 600° F. for fifteen minutes.

In practice, the polymeric material is applied to the substrate in an amount sufficient to give a coating of a desired thickness. The exact thickness is determined by the specific polymeric material utilized and the environment in which the so-coated article is to be employed. Typically, polymeric coating thicknesses range from about 0.001 of an inch to about 0.020 of an inch.

Once the polymeric material is in contact with the aluminum base substrate, it is heated to a temperature sufficient to cause it to flow and cover the desired portion of the substrate. After the polymeric material has been applied, the substrate is cooled to a temperature sufficient to cause the polymeric material to solidify and to become adherently bonded to the substrate.

The invention will now be described with respect to the following examples.

EXAMPLE I

Strips of 5052 aluminum alloy were cleaned by immersion in trichlorethylene and then rinsed with methyanol. The strips were then dried in a nitrogen atmosphere. Pellets of a polyetherimide polymer were spread over the strips and thermally compression molded at a pressure of 3500 psi at a temperature of 650° F. for ten minutes to form a continuous polymer coating. The strips were removed from the mold and cooled to room temperature. The so-coated aluminum strips were tested and it was observed that the polymeric overlay was not bonded at all to the aluminum base substrate.

EXAMPLE II

Example I was repeated except the so-cleaned strips, after cleaning and prior to molding, were immersed in an aqueous solution (deionized water) containing 0.1 mole/liter of sodium chromate, 0.5 mole/liter of sodium carbonate and 0.05 mole/liter calcium chloride. The temperature of the bath was maintained at about 150° F. The strips were left in the solution for about twelve minutes. Thereafter, they were removed from the bath, rinsed with tap water and dried in a nitrogen atmosphere. Compression mold bonding of pellets of polyetherimide on the strips was performed as in Example I. The so-coated aluminum strips were tested (both bend testing and immersion in boiling water) and it was observed that the polymeric overlay was adherently bonded to the aluminum base substrate.

EXAMPLE III

Example II was repeated except strips of 3003 aluminum alloy were used. Good bond results were obtained between the polymeric overlay and the aluminum base substrate.

EXAMPLE IV

Strips of 6061 aluminum alloy were cleaned by immersion in trichlorethylene and then rinsed with methanol. The so-cleaned strips were then immersed in an aqueous solution (deionized water) containing 0.1 mole/liter sodium chromate and 0.5 mole/liter of sodium carbonate and 0.005 mole/liter of calcium chloride. The temperature of the bath was maintained at about 205° F. The strips were left in the solution for about ten minutes. Thereafter, they were removed from the bath, rinsed with tap water and dried in a nitrogen atmosphere. Powdered polyamideimide (Torlon, a registered tradename of AMOCO Chemicals Corporation) polymer was spread over the strips and thermally compression molded at a pressure of 12,700 psi at a temperature of 650° F. for twenty minutes to form a continuous polymer coating. The strips were removed from the mold and cooled to room temperature. The aluminum strips were tested and it was observed that the polymeric overlay was adherently bonded to the aluminum base substrate.

EXAMPLE V

Example IV was repeated except prior to adding the polymer the strips were heated to a temperature of 450° F. for fifteen minutes to drive off all the water present. A good strong bond was obtained between the polymeric overlay and the aluminum base substrate. This bond proved superior to those strips not heated (as in Example III), especially with regard to pressure leak tests.

EXAMPLE VI

Example IV was repeated except the aqueous solution contained 0.2 mole/liter sodium chromate, 1.2 mole/liter of sodium carbonate and 0.01 mole/liter of calcium chloride. Good bond results were obtained between the polymeric overlay and the aluminum base substrate.

EXAMPLE VII

Strips of 6061 aluminum alloy were cleaned by immersion in trichlorethylene and then rinsed with methanol. The so-cleaned strips were then immersed in an aqueous solution (deionized water) containing 0.1 mole/liter sodium chromate, 0.5 mole/liter sodium carbonate and 0.005 mole/liter barium chloride. The temperature of the bath was maintained at about 184° F. The strips were left in solution for about twelve minutes. Thereafter, they were removed from the bath, rinsed with tap water and dried in a nitrogen atmosphere. Powdered polyphenylene sulfide polymer was spread over the strips and thermally compression molded at a pressure of 3,500 psi at a temperature of 550° F. for ten minutes to form a continuous polymer coating. The strips were removed from the mold and cooled to room temperature. The so-coated aluminum strips were tested and it was observed that the polymeric overlay was adherently bonded to the aluminum base substrate.

EXAMPLE VIII

Example VII was repeated except the 0.005 mole/liter of barium chloride was replaced with 0.005 mole/liter of strontium chloride. Good bond results were obtained between the polymeric overlay and the aluminum base substrate.

While the present invention has been described herein with respect to bonding high temperature resistant polymeric materials to an aluminum base substrate, it also has utility as a means of increasing the bond strength between an aluminum substrate coated with an adhesive and an overlay of polymeric material. This can be accomplished by applying the conversion coating described herein together with an adhesive to the surface of the aluminum base substrate prior to the bonding of the polymeric material to the substrate.

From the foregoing, it is clear that the instant invention provides a means of bonding high temperature resistant polymeric materials selected from the group consisting of polyphenylene sulfide, polysulfone, polyphenylsulfone, polyethersulfone, polyetheretherketone, polyetherimide and polyamideimide and compounds containing them to the surface of an aluminum base substrate. This bond improvement is especially increased for those aluminum base alloys which include relatively large alloying additions to the aluminum. Such coated substrates find utility in everyday applications such as coated aluminum base parts and structures.

While there have been described herein what are at present considered to be the preferred embodiments of this invention, it will be apparent to those skilled in the art that various changes and modifications may be made therein without departing from the present invention, and it is, accordingly, intended in the appended claims to cover all such changes and modifications as fall within the true spirit and scope of the instant invention.

What is claimed is:

1. A method for bonding a high temperature resistant polymeric material to an aluminum base substrate comprising:

providing an aqueous alkaline bath containing an alkali metal chromate salt selected from the group consisting of sodium, potassium, cesium, rubidium and mixtures thereof of chromic acid, and in addition to said chromate salt, an alkali metal carbonate, with the alkali metal being selected from the group consisting of sodium, potassium, cesium, rubidium and mixtures thereof, in a ratio of said carbonate to said chromic salt from 3 to 1 up to 9 to 1 wherein the carbonate concentration is at least about 0.0625 mole/liter, and from about 0.0005 mole/liter up to its saturation point in the bath of a water soluble salt of an alkaline earth metal selected from the group consisting of calcium, barium, strontium and mixtures thereof;

immersing the portion of the substrate which is to be coated with the polymer material into the bath for a time and at a temperature sufficient to cause a surface conversion coating to form on the exposed surface of the substrate;

removing the substrate from the aqueous bath after the formation of the conversion coating thereon;

applying at least one high temperature polymeric material selected from the group consisting of polyphenylene sulfide, polysulfone, polyphenylsulfone, polyethersulfone, polyetheretherketone, polyetherimide, polyamideimide and polymeric compounds containing them to the surface of the substrate which is to be coated;

heating said so-applied polymeric material to a temperature sufficient to cause it to flow and cover that portion of the substrate which is to be coated; and, cooling the heated coating to a temperature sufficient to cause it to solidify and become adherently bonded to the substrate.

2. The method of claim 1 wherein said alkali metal salt of chromic acid is a sodium salt.

3. The method of claim 2 wherein said alkali metal salt is sodium chromate.

4. The method of claim 1 wherein said alkali metal in said carbonate is sodium.

5. The method of claim 4 wherein said alkali metal carbonate is sodium carbonate.

6. The method of claim 1 wherein said water soluble alkaline earth metal is calcium.

7. The method of claim 6 wherein said water soluble salt of alkaline earth metal is calcium chloride.

8. The method of claim 1 wherein said substrate having the conversion coating therein is heated to a temperature sufficient to remove the water therefrom before the high temperature polymeric material is applied thereto.

9. A method of treating an aluminum base substrate to render it suitable for bonding a high temperature resistant polymeric material thereto which comprises:

providing an aqueous alkaline bath containing an alkali metal chromate salt selected from the group consisting of sodium, potassium, cesium, rubidium, and mixtures thereof of chromic acid, and in addition to said chromate salt, an alkali metal carbonate, with the alkali metal being selected from the group consisting of sodium, potassium, cesium, rubidium and mixtures thereof, in a ratio of said carbonate to said chromic salt from 3 to 1 up to 9 to 1 wherein the carbonate concentration is at least about 0.0625 mole/liter, and from about 0.0005 mole/liter up to its saturation point in the bath of a water soluble salt of an alkaline earth metal selected from the group consisting of calcium, barium, strontium and mixtures thereof;

immersing the portion of the aluminum base substrate which is to be coated with the polymer material in the bath for a period of time and at a temperature sufficient to cause a surface conversion coating to form on the exposed surface of the substrate; and, removing the substrate from the aqueous bath after the formation of the conversion coating thereon.

10. The method of claim 9 wherein said alkali metal salt of chromic acid is a sodium salt.

11. The method of claim 10 wherein said alkali metal salt is sodium chromate.

12. The method of claim 9 wherein said alkali metal in said carbonate is sodium.

13. The method of claim 12 wherein said alkali metal carbonate is sodium carbonate.

14. The method of claim 9 wherein said water soluble alkaline earth metal is calcium.

15. The method of claim 14 wherein said water soluble salt of alkaline earth metal is calcium chloride.

16. The method of claim 9 wherein after removing said substrate from the aqueous bath after the formation of said conversion coating it is heated to a temperature sufficient to remove the water therefrom.

* * * * *